United States Patent [19]

Takada

[11] Patent Number: 5,042,879
[45] Date of Patent: Aug. 27, 1991

[54] SEAT FOR VEHICLE
[75] Inventor: Naoyuki Takada, Ayase, Japan
[73] Assignee: Ikeda Bussan Company Ltd., Japan
[21] Appl. No.: 366,770
[22] Filed: Jun. 15, 1989
[30] Foreign Application Priority Data
  Sep. 29, 1988 [JP] Japan .............. 63-127764[U]
[51] Int. Cl.⁵ ................. A47C 31/00; A62B 35/00
[52] U.S. Cl. ................................. 297/468; 297/473
[58] Field of Search .................. 297/482, 468, 473
[56] References Cited
  U.S. PATENT DOCUMENTS
  4,262,963  4/1981  Bauer et al. ................ 297/473
  FOREIGN PATENT DOCUMENTS
  2655846  6/1977  Fed. Rep. of Germany ...... 297/468
  0143245  6/1986  Japan ............................ 297/468

Primary Examiner—Jose V. Chen
Attorney, Agent, or Firm—Gifford, Groh, Sprinkle, Patmore and Anderson

[57] ABSTRACT

A seat for a vehicle which includes a seat belt, said seat including a seat cushion mounted on a longitudinal slide mechanism, a hinge arm pivotally mounted on a hinge bracket secured to a side of the seat cushion, and a seat back attached to the hinge arm, a pad material and a skin material for a side of the seat back being disposed outside an upper portion of the hinge arm, adjacent a tongue portion of the seat belt, and a seat belt tongue entrance-preventing member being provided outside an exposed portion of the hinge arm and extending downwardly from lower ends of the pad and skin materials at the side of the seat back having an entrance-preventing surface which projects outwardly from a surface of the skin material at the side of the seat back and which is curved toward a rear end of the hinge arm to deflect the seat belt tongue portion away from the seat as the seat cushion is moved rearwardly along the slide mechanism.

9 Claims, 2 Drawing Sheets

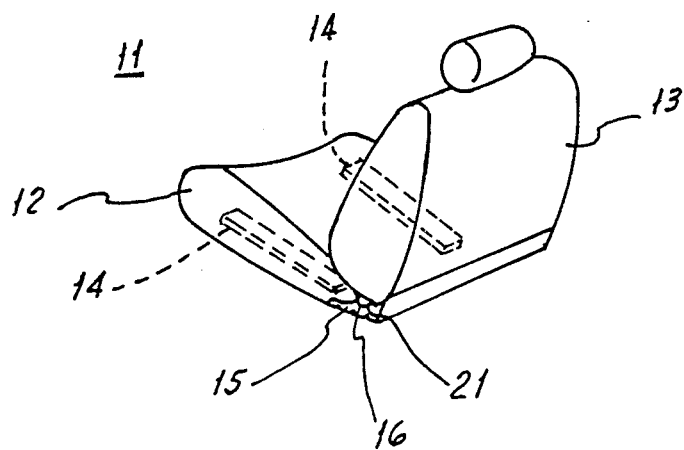
FIG. 1
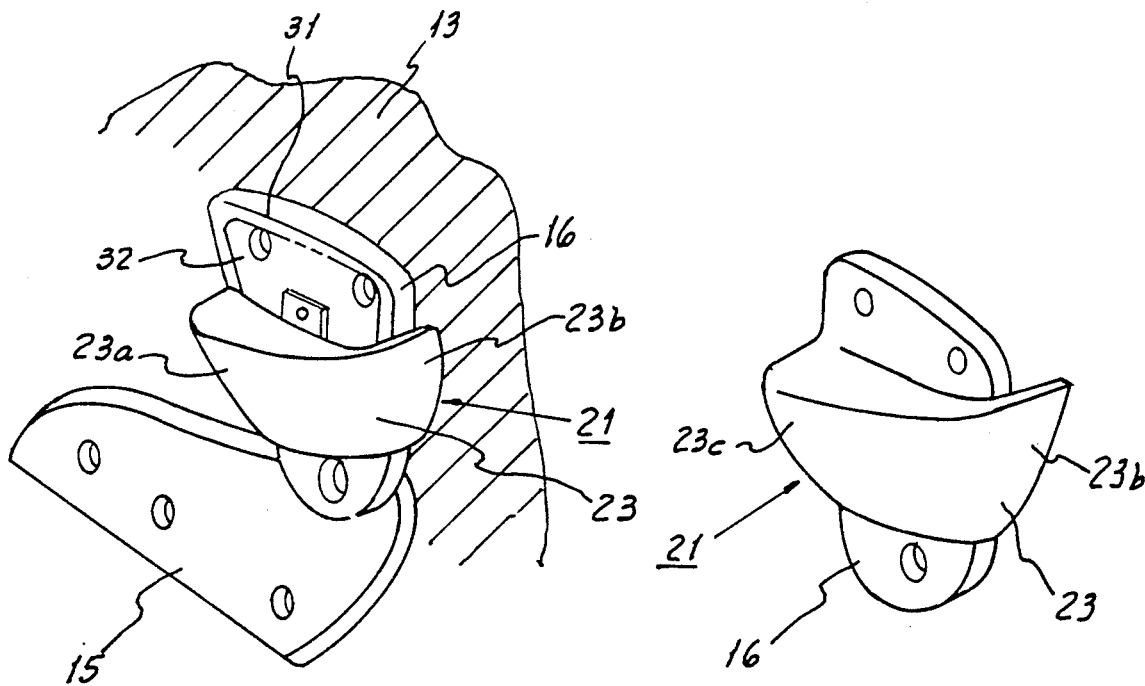
FIG. 2
FIG. 3

SEAT FOR VEHICLE

BACKGROUND OF THE INVENTION

1. Field of the Invention

The present invention relates to a seat for a vehicle comprising a seat cushion mounted on a longitudinal slide mechanism, a hinge arm pivotally mounted on a hinge bracket secured to a side of the seat cushion, and a seat back attached to the hinge arm, and more particularly, to means mounting the seat for preventing the seat belt from becoming jammed into the seat as the seat is moved to a rearwardly adjusted position.

2. Description of the Prior Art

In conventional front seat assemblies for vehicles provided with a seat belt, difficulty has been encountered when the seat is adjusted rearwardly to accomodate a driver or passenger. Very often the seat will be jammed about the end or tongue of the seat belt which is held in position by a cover or the like to be grasped by the user, sometimes causing the end of the seat belt to enter into the seat between the cover and the cushion of the seat. Whether this happens, or the end merely becomes jammed against the seat, the belt is difficult to grasp and to use.

SUMMARY OF THE INVENTION

It is an object of the present invention to provide a seat for a vehicle wherein a seat belt tongue can be effectively prevented from entering inside the seat between the pad material and a skin material or cover for a side of a seat back when the seat cushion has been moved longitudinally by the longitudinal slide mechanism, and the seat belt tongue will always be held outside the seat where it can be easily grasped by the user.

To accomplish the above object, according to the present invention, there is provided a seat for a vehicle, comprising a seat cushion mounted on a longitudinal slide mechanism, a hinge arm pivotally mounted on a hinge bracket secured to a side of the seat cushion, and a seat back attached to the hinge arm, wherein the seat further includes a pad material and a skin material or cover for a side of the seat back, which materials are disposed outside an upper portion of the hinge arm, and a deflecting member provided outside an exposed portion of the hinge arm extending downwardly from lower ends of the pad and skin materials at the side of the seat back, the deflecting member having an entrance- preventing surface at the side of the seat back and which is curved toward a rear end of the hinge arm.

With the above construction, when the seat cushion has been moved longitudinally rearwardly, the leading end of the seat belt tongue is deflected outwardly away from the side of the seat back and therefore it cannot enter inside the pad and skin materials at the side of the seat back. Thus, the seat belt tongue will always be outside and away from the seat where it can be easily grasped and pulled to the attached position by the user.

The above and other objects, features and advantages of the invention will become apparent from a reading of the following description of the preferred embodiment, taken in conjunction with the accompanying drawings.

BRIEF DESCRIPTION OF THE DRAWINGS

FIGS. 1 to 4 schematically illustrate one embodiment of a seat for a vehicle according to the present invention, wherein FIG. 1 is a perspective view of the seat;

FIG. 2 is a perspective view of a hinge arm;

FIG. 3 is a perspective view of a different embodiment of a hinge arm;

FIG. 4 is a perspective view of the seat, illustrating a relationship between a seat belt tongue and a seat belt deflecting member.

DESCRIPTION OF THE PREFERRED EMBODIMENT

Figure 5:
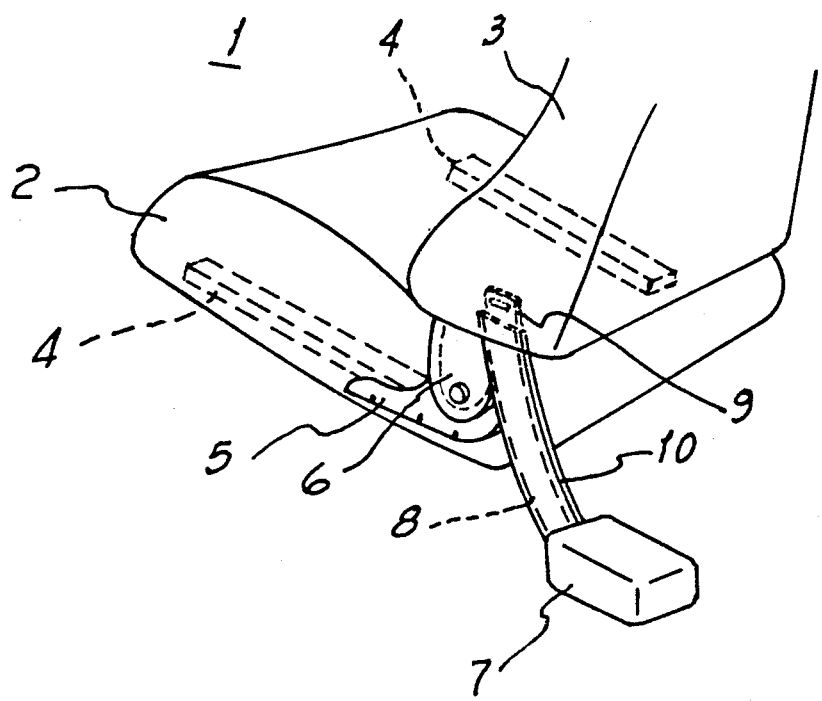
FIG. 5 is a perspective view of the prior art seat, illustrating a relationship between a seat belt tongue and a hinge arm.

FIG. 5 illustrates a seat and seat belt arrangement of the prior art. In the conventional seat for a vehicle or the like, a seat cushion 2 is placed on a longitudinal slide mechanism 4 longitudinally disposed on a vehicle floor surface, so that it may be longitudinally moved for adjustment. The vehicle is also equipped with a seat belt 8, so that the abdomen, shoulder and the like of the seat occupier may be fastened and supported by the seat belt 8.

One end of the seat belt 8 is disposed in proximity to the exterior of a hinge arm 6 of the seat back 3 so that the seat belt 8 may be easily drawn out of a retractor 7 secured on the vehicle floor surface by a person occupying the seat 1. The hinge arm 6 is pivotally supported at its lower end on a hinge bracket 5. The seat belt 8 is held in a position to be readily grasped by the user by a cover member 10 of a synthetic resin. The cover member 10 holds a seat belt tongue 9 of the seat belt 8 in a position projecting above an upper end of the cover member 10. The seat belt 8 can be drawn out of the retractor 7 and locked into a buckle (not shown) provided on the opposite side of the seat cushion 2.

Since the seat belt tongue 9 projects above the upper end of the cover member 10 extending from the retractor 7, the seat belt tongue can, when the seat cushion is moved longitudinally rearwardly, become jammed against the seat 1 or even enter inside a pad material and a skin material at a side of the seat back 3, so that pulling the seat belt out of the cover is impossible.

The present invention will now be described by way of one embodiment with reference to FIGS. 1-4 of the accompanying drawings.

Referring to FIGS. 1 to 4, there is schematically shown a seat for a vehicle according to one embodiment of the present invention, generally indicated by 11. The seat 11 comprises a seat cushion 12 mounted on a longitudinal slide mechanism 14, a hinge bracket 15 secured to a side of the seat cushion 12, a hinge arm 16 pivotally carried on the hinge bracket 15, and a seat back 13 secured to an upper portion of the hinge arm 16.

Figure 4:
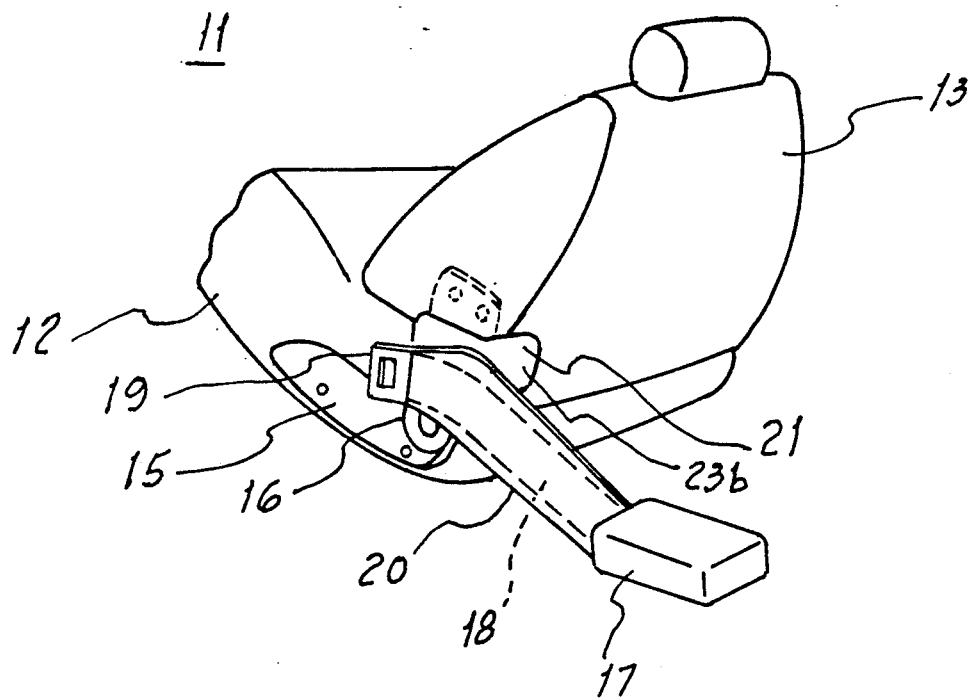

As best shown in FIG. 4, a seat belt retractor 17 is secured to a vehicle floor surface and is supported so that a seat belt 18 may be drawn out of the retractor 17 by grasping a seat belt tongue 19 at a leading end of the seat belt 18 projecting above an upper end of a cover member 20 made of a synthetic resin. The seat belt tongue 19 is adapted to be inserted and locked into a buckle (not shown) mounted on the opposite side of the seat cushion 12 in a conventional manner.

It should be noted that the description of a construction of a shoulder belt portion is omitted in the present embodiment, but the present invention is also applicable to a vehicle seat having a shoulder belt portion. In such a case, the seat belt could be a so-called passive belt which comprises a shoulder belt portion attached at one end thereof to an upper portion of a vehicle door, so that an occupier is automatically fastened and supported by the seat belt in response to opening and closing of the door.

The upper portion of the hinge arm 16 is inserted inside a pad material 31 and a skin material 32 (FIG. 2) at a side of the seat back 13, with a lower portion of the hinge arm 16 being exposed below the side of the seat back 13. Still referring to FIG. 2, a member 21 for preventing entrance of the seat belt tongue 19 is provided outside the exposed portion of the hinge arm 16. The member 21 may be a specially formed member welded or otherwise secured by other securing means to the conventional hinge arm 16, as shown in FIG. 2, as well as a member integrally formed on a hinge arm 16, as shown in FIG. 3.

The member 21 has a surface 23 which projects outwardly from a surface of the skin material at the side of the seat back 13 and which is curved toward the rear end of the hinge arm 16. The surface 23 of the member 21 is formed so that the surface 23b at the rear of the member 21 is closer to the seat 13 than the surface 23a at the front of member 21.

Thus, when the seat cushion 12 has been longitudinally moved for adjustment, particularly when it has been moved rearwardly from a certain front location, the seat belt tongue 19 abuts against a rearwardly curved portion 23b of the entrance preventing surface 23 and is guided or deflected along the front face portion 23a of the surface 23. In this manner, the seat belt tongue 19 is deflected away from the seat and is prevented from jamming against the side of the seat back 13 and from entering inside the pad material 31 and skin material 32 at the side of the seat back 13 when the hinge member 16 extends from underneath the skin material.

It should be apparent that a construction has been described which avoids a problem encountered with prior art arrangements. It is also apparent that although I have described several embodiments of the present invention, many changes can be made in the described embodiment without departing from the spirit of the invention as expressed by the appended claims.

I claim:

1. A seat for a vehicle, comprising:
a seat cushion movably, mounted on a longtudinal slide mechanism;
a hinge arm pivotaly mounted on a hinge bracket, said bracket secured to a side of said seat cushion;
a seat back attached to an upper portion of said hinge arm, said seat further including a pad material and a skin material at a side of said seat back, said pad and skin materials being disposed on the outside of an upper portion of said hinge arm; a seat belt mounted to said vehicle and including a tongue, said tongue being in a position to be engaged by said seat as said seat is moved by said longitudinal slide mechanism; and
a seat belt tongue entrance-preventing member, said member located along an exposed portion of said hinge arm, said member further exposed from said pad material and skin material at said side of said seat back so as to engage with said tongue portion of said seat belt, said preventing member further having an entrance-preventing surface which projects outwardly from said skin material at said side of said seat back so as to engage said tongue portion and to deflect said tongue portion away from said seat as said seat is moved longitudinally rearwardly by said slide mechanism.

2. In a seat for a vehicle, said seat comprising:
means for moving said seat forwardly and rearwardly; said seat mounted on said means for moving a seat belt mounted to said vehicle and having a tongue disposed in a position so as to be engaged by said seat upon rearward movement of said seat; and means for engaging said tongue of said seat belt so as to move said tongue outwardly and away from said seat upon rearward movement of said seat.

3. The invention as defined in claim 2 comprising in addition a surface projecting outwardly from said seat in a direction from the rear of said seat toward the front of said seat.

4. In a seat for a vehicle, said seat comprising:
means for moving said seat forwardly and rearwardly; said seat mounted on said means for moving
a seat belt mounted to said vehicle and having a tongue , said tongue engaged by said seat upon rearward movement of said seat; and
means for engaging said tongue of said seat belt so as to move said tongue portion outwardly and away from said seat upon rearward movement of said seat, said seat comprising in addition a seat back, a seat cushion, and hinge means for hingedly connecting said seat cushion and said seat back, said seat belt tongue engaging means further being a part of said hinge means.

5. The invention as defined in claim 4 and including said tongue engaging means being formed as one piece with said hinge means.

6. The invention as defined in claim 4 and including said tongue engaging means comprising a separate piece fixedly secured to said hinge means.

7. In a seat for a vehicle, said seat comprising:
means for moving said seat forwardly and rearwardly; said seat mounted on said means for moving a seat belt mounted to said vehicle and having a tongue disposed in a position to be engaged by said seat upon rearward movement of said seat; and
means for engaging said tongue of said seat belt so as to move said tongue outwardly and away from said seat upon rearward movement of said seat, said seat having a front and a rear, said means for engaging said tongue comprising a surface extending outwardly from said seat from the rear of said seat toward the front of said seat, said seat comprising in addition a seat back, a seat cushion, and hinge means for hingedly connecting said seat cushion and said seat back, said surface further being formed on said hinge means.

8. In a seat for a vehicle, said seat comprising:
means for moving said seat forwardly and rearwardly; said seat mounted on said means for moving
a seat belt mounted to said vehicle and having a tongue disposed in a position to be engaged by said seat upon rearward movement of said seat;
means for engaging said tongue of said seat belt so as to move said tongue outwardly and away from said seat upon rearward movement of said seat, said seat having a front and a rear, said means for engaging said tongue comprising a surface extending outwardly from the rear of said seat toward the front of said seat, said seat further comprising a seat back and a seat cushion, said seat back including a pad and a skin covering said pad; and a hinge for connecting said seat back and said seat cushion, said hinge. carrying said means for engaging said tongue.

9. In a seat for a vehicle, said seat comprising means for moving said seat forwardly and rearwardly, said seat mounted on said means for moving a seat belt mounted to said vehicle and having a tongue disposed in a position to be engaged by said seat upon rearward movement of said seat;

means for engaging said tongue portion of said seat belt so as to move said tongue portion outwardly and away from said seat upon rearward movement of said seat, said seat having a front and a rear, said means for engaging said tongue further comprising a surface projecting outwardly and away from the rear of said seat and toward the front of said seat, said seat further comprising a seat back and a seat cushion, said seat back including a pad and a skin covering said pad; and a hinge for hingedly connecting said seat back and said seat cushion, said hinge having a portion extending outwardly from said skin and said pad of said seat back, said tongue being projected away from said extending surface of said hinge upon contact with said surface, said surface being formed on said hinge.

* * * * *